US008736243B2

(12) United States Patent
Gizara

(10) Patent No.: US 8,736,243 B2
(45) Date of Patent: May 27, 2014

(54) CONTROL MULTIPLEXOR FOR A SWITCH MODE POWER SUPPLY

(75) Inventor: Andrew Roman Gizara, Lake Forest, CA (US)

(73) Assignee: Lanery MGMT. Limited Liability Company, Dover, DE (US)

( * ) Notice: Subject to any disclaimer, the term of this patent is extended or adjusted under 35 U.S.C. 154(b) by 609 days.

(21) Appl. No.: 12/642,778

(22) Filed: Dec. 19, 2009

(65) Prior Publication Data
US 2011/0148374 A1 Jun. 23, 2011

(51) Int. Cl.
H02M 3/157 (2006.01)
(52) U.S. Cl.
USPC .......................................... 323/283; 323/285
(58) Field of Classification Search
USPC ............. 323/282, 283, 285; 363/21.05, 21.13
See application file for complete search history.

(56) References Cited

U.S. PATENT DOCUMENTS

| 6,608,767 | B1 * | 8/2003 | Stanley | 363/16 |
|---|---|---|---|---|
| 6,940,189 | B2 * | 9/2005 | Gizara | 307/151 |
| 7,583,555 | B2 * | 9/2009 | Kang et al. | 365/226 |
| 7,602,155 | B2 * | 10/2009 | Markowski | 323/222 |
| 2004/0095111 | A1 * | 5/2004 | Kernahan | 323/282 |
| 2005/0134240 | A1 * | 6/2005 | McClure | 323/273 |
| 2007/0210777 | A1 * | 9/2007 | Cervera et al. | 323/284 |
| 2008/0088385 | A1 * | 4/2008 | Gizara | 332/109 |
| 2008/0136389 | A1 * | 6/2008 | Uchimoto et al. | 323/282 |
| 2008/0169798 | A1 * | 7/2008 | Williams et al. | 323/299 |
| 2009/0085546 | A1 * | 4/2009 | Phadke et al. | 323/284 |
| 2009/0128114 | A1 * | 5/2009 | Brown et al. | 323/283 |
| 2009/0153111 | A1 * | 6/2009 | Mao et al. | 323/272 |

FOREIGN PATENT DOCUMENTS

| EP | 2043242 A2 | 4/2009 |
|---|---|---|
| WO | WO 2008/048865 A2 | 4/2008 |
| WO | WO 2008/060850 A2 | 5/2008 |

OTHER PUBLICATIONS

International Search Report dated Jun. 12, 2011 for PCT Application PCT/US2010/060540, 3 pages.

* cited by examiner

Primary Examiner — Adolf Berhane
Assistant Examiner — Fred E Finch, III
(74) Attorney, Agent, or Firm — Amin, Turocy & Watson, LLP

(57) ABSTRACT

A digital circuit directs operation of a pulse width modulation or pulse frequency modulation controller varying its control between closed loop and open loop topology. An exemplary control plant could embody a step-down switch mode power supply providing a precise sequence of voltages or currents to any of a variety of loads such as the core voltage of a semiconductor unique compared to its input/output ring voltage. A state machine monitors pulse width or pulse frequency from the pulse width modulation or pulse frequency modulation controller, respectively, while either type of controller operates in its closed loop topology, to determine if the present power state of the system matches the predicted load as characterized from a predetermined model used in conjunction with design automation tools. The state machine averages pulse widths or pulse frequencies monitored in the closed loop topology. If the average deviates from the predicted pulse width or pulse frequency for the present power state, the state machine updates a corresponding value in a table of pulse width or pulse frequency values from which an open loop controller applying pulse width modulation or pulse frequency modulation, respectively, generates a near critical damped step response during system power state transitions or maintains a maximally flat voltage during system current transients.

43 Claims, 6 Drawing Sheets

| | |
|---|---|
| 101 – input/output pad ring | 113 – Schottky diode |
| 103 – P channel field effect transistor | 114 – bonding pad |
| 105 – N channel field effect transistor | 115 – closed loop circuit |
| 106 – output capacitor | 117 – output bonding pad |
| 107 – pull-up resistor | 118 - open loop circuit |
| 108 - pull-down resistor | 119 - switch |
| 109 – bonding pad | 129 – controller |
| 110 – bonding pad | 131 – gate driver |
| 111 – bonding pad | 132 – gate driver |
| 112 – output bonding pad | 133 – bonding pad |
| | 134 – logic device |

| | |
|---|---|
| 129 | – controller |
| 200 | – supervisory state machine |
| 201 | – binary input pads |
| 202 | – offset bus |
| 203 | – look up table |
| 205 | – arithmetic logic unit |
| 209 | - decoder |
| 210 | – counter |
| 211 | – clock |
| 214 | – D flip-flop |
| 215 | – OR gate |
| 216 | – AND gate |
| 217 | – asynchronous reset output |
| 220 | – feedback bus |
| 221 | – look-up table access bus |

Prior Art

115 – closed loop circuit
300 – analog voltage comparator
301 – amplifier
303A - reference voltage buffer
303B - buffer
304 – node
305 - DAC
306-308, 311 - resistors
309 - 312 – capacitors 115 – closed loop circuit
211 – clock
616 – timing control block
617 – frequency digital clock
618 – delay measurement flip-flop
619 – delay pulse controller
621 - buffers 200 – supervisory state machine
700A – flip-flop
700B – XOR gate
701A – NAND gate
701B – NAND gate
702 – counter
702B – bus
703 – digital comparator

CONTROL MULTIPLEXOR FOR A SWITCH MODE POWER SUPPLY

BACKGROUND OF THE INVENTION

1. Field of the Invention

The present invention is generally in the field of switch mode power supply control systems. More specifically, the present invention is in the field of combining open loop and closed loop pulse width modulation or pulse frequency modulation control operating within a digital control system for a power supply.

2. Background Art

Many years of research in switch mode power supply controller design have lead to a multitude of schemes that exist within the topology of closed loop control systems. The inventor of the present invention has recently invented power supply control systems that comprise both open loop and optionally, closed loop topology. For instance, the invention of U.S. Pat. No. 6,940,189 teaches open loop control based on pulse width modulation or pulse frequency modulation derived from comparing a frequency dividing clock counter value to a table of values corresponding to the present power state of the system under control based on predetermined characterization data of the system. Having predetermined characterization data affords the designer the opportunity to implement an open loop topology of precise control that also saves component cost and reduce circuit cost and complexity. Additionally, the specification of U.S. Pat. No. 6,940,189 also describes binary input pads into the controller availing means of offsetting the entries in the table and thus providing closed loop control based on empirical data. Furthermore, the inventions described in World Intellectual Property Organization Publications numbered WO 2008/048865 A2 and WO 2008/060850 A2 teach structures and methods of implementing pulse width modulation control systems generating pulse sequences that provide a near critical damped step response and maintain a maximally flat voltage during current transients in such systems respectively. The specification in the World Intellectual Property Organization Publication numbered WO 2008/048865 A2 explicitly illustrates such a system fixed in both open loop and closed loop topologies.

There exists a multitude of switch mode power supply control systems comprising closed loop topology, each offering unique advantages such as proprietary or public domain design concepts reducing cost of design implementation, design reuse, and design sustaining, thus reducing cost of market entry and time-to-market to each purveyor of such proprietary or public domain designs. Most of these designs likely satisfactorily meet the requirements of precise steady state voltage regulation in environments subject to stochastic variation such as temperature drift necessitating closed loop topology control systems. However, these proprietary or public domain closed loop control system designs could achieve higher energy efficiency or lower component cost if, during most of the steady state operation, the components comprising the feedback and/or feed forward loops could be powered-down, or shared amongst other controllers powering other voltage domains. Furthermore, these proprietary or public domain closed loop control system designs would benefit from the assurance of attaining a critical damped step response during a power state transition of the system under control. Attaining a critical damped step response assures the fastest possible response time when providing power to loads typically requiring precise voltage regulation such as semiconductor cores, typically tolerating voltage excursions of five percent or less beyond their given set-point. For instance, a practical benefit of meeting the fastest possible response time thus allows such devices to go into sleep mode quicker and more often, and of course, come out of sleep mode faster, an optimal means to reduce costs and enhance power efficiency of the total system-on-chip solution.

Therefore, there exists a need for a structure which combines the benefits of proprietary or public domain closed loop topology power supply control systems for steady state operation while attaining the high power efficiency of an open loop structure generating a near critical damped step response during system power state transitions and/or maintaining a maximally flat voltage during current transients.

SUMMARY OF THE INVENTION

The present invention is directed to a novel structure that enables operation of a switch mode power supply alternating between closed and open loop control topology. The present specification incorporates by reference U.S. Pat. No. 6,940,189, SYSTEM AND METHOD FOR INTEGRATING A DIGITAL CORE WITH A SWITCH MODE POWER SUPPLY; World Intellectual Property Organization Publication number WO 2008/048865 A2, PULSE WIDTH MODULATION SEQUENCE GENERATING A NEAR CRITICAL DAMPED STEP RESPONSE; and World Intellectual Property Organization Publication number WO 2008/060850 A2, PULSE WIDTH MODULATION SEQUENCE MAINTAINING MAXIMALLY FLAT VOLTAGE DURING CURRENT TRANSIENTS as structures and methods from which to design the open loop control of the present invention, while introducing novel concepts to further enable the design and development of a system benefiting from both open and closed loop topology. The present specification exemplifies a novel structure integrating a semiconductor die of plural power supply voltage domains with an alternating open and closed loop switch mode DC-to-DC converter to obtain optimal power savings, and minimal heat dissipation and component cost. The present specification more fully and broadly enables one of ordinary skill in the art to implement periodically closed loop operation of the control system compared to the aforementioned incorporated references.

In addition, the present invention is not limited to application to the exemplary system. The present invention may be applied to control of any second or higher order system mathematically analogous to pulsed control requiring near critical damped step response. Any electrical, mechanical or electro-mechanical system under the mathematical analogue of pulse width or frequency modulation control may especially benefit from the present invention whereby without the present invention, closed loop control alone could result in excessive component cost; or in less than optimal step response, a characteristically slow settling over-damped, or imprecise settling under-damped step response for certain power state transitions. Thus, the present invention introduces an optimally fast response for all power state transitions, a high performance power supply controller design where previously the goals of near critical damped step response and of precise load regulation in a closed loop topology were mutually unattainable to the extent attained in the present invention.

DETAILED DESCRIPTION OF THE INVENTION

The present invention pertains to a switch mode power supply control system that multiplexes between open loop and closed loop control. The following description contains specific information pertaining to various embodiments and implementations of the invention. One skilled in the art will recognize that one may practice the present invention in a manner different from that specifically depicted in the present specification. The following drawings and their accompanying detailed description apply as merely exemplary and not restrictive embodiments of the invention.

Figure 1:
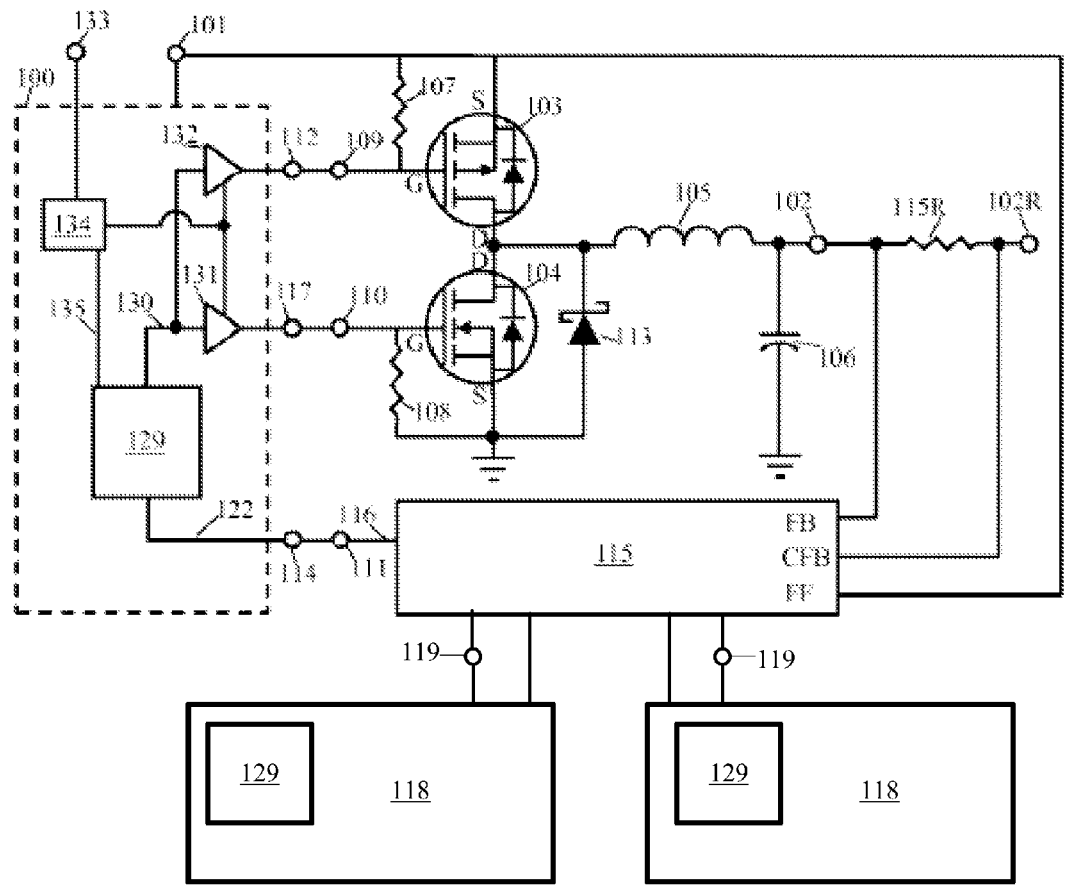
FIG. 1 illustrates a schematic view of an exemplary switch mode power supply system in accordance with one embodiment of the present invention.

FIG. 1 illustrates a schematic of an exemplary switch mode power supply comprising the control plant of the present invention. FIG. 1 of the present specification shares a similarity in certain components of an exemplary embodiment of the reference U.S. Pat. No. 6,940,189 with the present invention adding novel functionality particularly within the controller 129. For instance, as before, Block 100 represents the semiconductor die. The semiconductor die 100 may embody any of a variety of functions that one could implement using digital standard cell or semi-custom Application Specific Integrated Circuit "ASIC", analog or analog and digital mixed signal design methodologies, any of such implementation in said semiconductor die 100 wherein the die itself requires plural unique voltage domains for powering its circuitry. An exemplary embodiment within the semiconductor die 100 could be a digital core that performs any of a variety of tasks including generic microprocessor tasks, digital signal processing or media stream specific compression or encoding or decompression or decoding, whereby the core of the semiconductor die 100 is powered at a lower voltage 102 than its input/output pad ring 101. The exemplary embodiment within FIG. 1, with the exception of the novel controller 129 comprises a typical configuration and components that constitute a canonical synchronous step-down or "buck" switch mode power supply well understood by one of ordinary skill in the art.

Of course, semiconductor die 100 could comprise the digital circuits of the switch mode power supply controller alone, with the output voltage 102 supplying power to any variety of loads on separate modules or semiconductor die such as the dimmer function for Light Emitting Diodes "LED's". The output voltage 102 satisfying requirements of certain loads, or a time variant input voltage 101 source such as a battery, could necessitate step-up or "boost" switch mode power supply functionality. A power supply controller 129 would benefit from a voltage feed-forward loop originating at the input voltage 101 going into the closed loop circuit 115FF if the application demands implementation with time varying input voltage 101 sources such as a battery.

Although FIG. 1 depicts a synchronous step-down or "buck" DC-to-DC converter, a synchronous step-up or "boost" or the combination thereof, synchronous "buck/boost" configuration thus would not exist beyond the scope and spirit of the present invention. It is well understood by one of ordinary skill in the art, that to realize a synchronous boost converter, the designer would situate the P-channel enhancement mode field effect transistor 103 in FIG. 1 instead with its source node 103S common to the output voltage 102 and anode of the output capacitor 106, schematically breaking the connection between the inductor 105 and the output capacitor 106 with transistor 103 drain node 103D now connected to the inductor 105. Along with this circuit modification, the designer of a synchronous boost converter would also instead situate the N-channel enhancement mode field effect transistor 104 drain 104D and Schottky diode 113 anode instead connected to the node now connected to the inductor 105 and new location of the drain 103D of the P-channel enhancement mode field effect transistor 103, with source 104S and cathode of the Schottky diode 113 remaining connected to the ground reference node as shown. As in the exemplary synchronous buck converter, these two switching elements of the synchronous boost converter work complementary to each other, one conducting while the other remains high impedance between drain and source, and switching vice versa. Of course, a combination synchronous buck/boost configuration would implement four such switching elements, the synchronous buck portion as shown in FIG. 1 with the addition of two more switching elements as just described for the synchronous boost portion. In a synchronous buck/boost combination switch mode power supply, the buck switching elements 103, 104 are fixed on/off allowing current flow through the inductor 105 when operating in boost mode and vice versa, in buck mode, the boost switching elements are fixed on/off allowing inductor 105 current to flow to the output capacitor 106. In either mode, the switching elements associated with that mode operate complementary; only one of the two power switching elements 103, 104 activates in its "on" state at any given moment. Also, synchronous buck/boost combination switch mode power supply functionality likely necessitates voltage feed-forward 115FF to determine buck or boost operation. These various buck, boost, or buck/boost circuit configurations clearly remain within the scope and spirit of the present invention when periodically a feedback or feed-forward loop affects the voltage regulation parameters of pulse width or pulse frequency of the power switching elements 103, 104 and a controller 129 detects and compares these parameters and adapts its open loop operation accordingly. The present specification will subsequently provide exemplary means for parameter detection, comparison, and adaptation in the description of FIG. 7.

This specification hereby notes that such mostly open loop operation combined with periodic closed loop operation avails the designer the reuse of the same closed loop circuit 115 for multiple controllers 129 powering a plurality of voltage domains 118 thus saving component cost for a complete system. Analog switches 119 can be implemented to switch-in and switch-out a closed loop circuit 115 in a time division multiplexed manner amongst multiple instances of controller 129 and multiple instances of external switching components associated with additional voltage domains 118, namely power switching elements 103, 104, inductor 105, output capacitor 106, Schottky diode 113 and pull, up/pull-down resistors 107, 108. As originally described in the reference U.S. Pat. No. 6,940,189, while portrayed in FIG. 1 as external resistors 107, 108, the same exact functionality may be obtained through the use of two 10-to-100 microampere current sources configured as default weak pull-up and weak pull-down, respectively, standard cell output pads internal to the semiconductor die 100. Of the analog switches introduced above, one switch would periodically connect momentarily the path 116, while another analog switch likewise connects path 115FB, 115CFB, or 115FF of a single closed loop circuit 115, per each instance of controller 129 and associated external components for each of a plurality of power domains 118 in a sequential fashion thus saving cost of multiple instances of closed loop circuit 115 components. The present specification will subsequently describe the operation of the controller 129 that enables this time division multiplexing functionality along with the ability to power-down the active components of the closed loop circuit 115 to reduce power consumption.

A current feedback loop sensing voltage across current sensing resistor 115R by subtracting the voltage measured at node 115CFB from the voltage measured at node 115FB would facilitate operation of a switch mode power supply controller 129 for loads requiring current regulation including, but not limited to LED's. In these systems, the resistance value of current sensing resistor 115R is chosen for a measurable but minimized voltage drop across it directly affecting efficiency of the power supply. The voltage 102R measured at node 115CFB may be fed-back to maintain precise voltage regulation to a load in these systems requiring current regulation.

The aforementioned analog switches that switch-in or switch-out a connection of signal path 116 from a single closed loop circuit 115 to any one of a plurality of controllers 129 per each of a plurality of power domains may exist on the die 100 side of bonding pad 114, or the side of bonding pad 111 along with the remaining components external to the die 100. As shown in FIG. 1 bonding pads 109, 110 attach the gates of the power switching elements 103, 104 to the output bonding pads 112, 117 respectively, outputting the signal from the gate drivers 132, 131 respectively, within the semiconductor die 100. Because the specification of the reference U.S. Pat. No. 6,940,189 covered the design requirements and operation of gate drivers 131, 132 in adequately thorough detail, the present specification needs no further discourse thereof. The exact situation of any previously described external components including but not limited to the power switching elements 103, 104, whether within or external to the semiconductor die 100 remains well within the scope and spirit of the present invention.

FIG. 1 further illustrates several functions within the semiconductor die 100. While introduced in FIG. 1, FIG. 2 elucidates in detail exemplary circuits to enable the functions of the pulse width modulation or pulse frequency modulation controller 129 as described subsequently herein the present specification. As described in the text of the reference U.S. Pat. No. 6,940,189, block 134 represents the logic employed in power-up sequencing and under voltage lock out functions. Pad 133 would likely be implemented as a low true reset input that an external power supervisor module outputs conditionally from monitoring the input/output ring voltage 101, unless the design utilizes voltage feed-forward 115FF to monitor the input/output ring voltage 101 as previously described in the present specification. Whether internal or external, a reset supervisor performs the same function in this exemplary embodiment when powering-up. On power-up, upon arriving at a satisfactory voltage level for a prescribed period, the supervisor brings the reset signal on pad 133 to an inactive state. As shown in FIG. 1, if the reset signal is low true, the logic block 134 may simply route this directly to the positive true output enable inputs of the gate drivers 131, 132. Ultimately the logic block 134 is also responsible for proper power-up and power-down sequencing of the other internal functional blocks of the semiconductor die 100, including the internal clocking circuitry and thus the pulse width modulation or frequency modulation block 129, and this may be achieved by simply giving proper delay to the input reset signal from pad 133 before routing to other remaining functional blocks within the semiconductor die 100. As such, under voltage lock out is essentially the function provided by the external power supervisor circuit, the result is identical regardless of power-up or power-down. When the reset signal 133 is active due to under voltage of the input/output pad ring voltage 101, the gate drivers 131, 132 are placed into high impedance state, and the resistors 107, 108 bring the power switching elements 103, 104 into an innocuous off state. The present invention adds the functionality of signal 135, which, upon power-up reset, signals the controller 129 to initiate its state machine 200 and any associated memory or registers needed for the process of voltage or current regulation parameter detection, comparison, and adaptation as follows in the description of FIG. 7.

While FIG. 1 of the present specification portrays signal 135 as a single line, within the scope of the present invention exists a two wire communication means, for example, a standard communication protocol such as System Management Bus, "SMBus". Thus, besides power-on reset functionality as stated above, block 134 could implement an SMBus controller or master, through which various system functional blocks within semiconductor die 100 or within the system in general, could communicate various system power states and power state transitions to one or plural pulse width modulation or pulse frequency modulation controllers 129.

Figure 2:
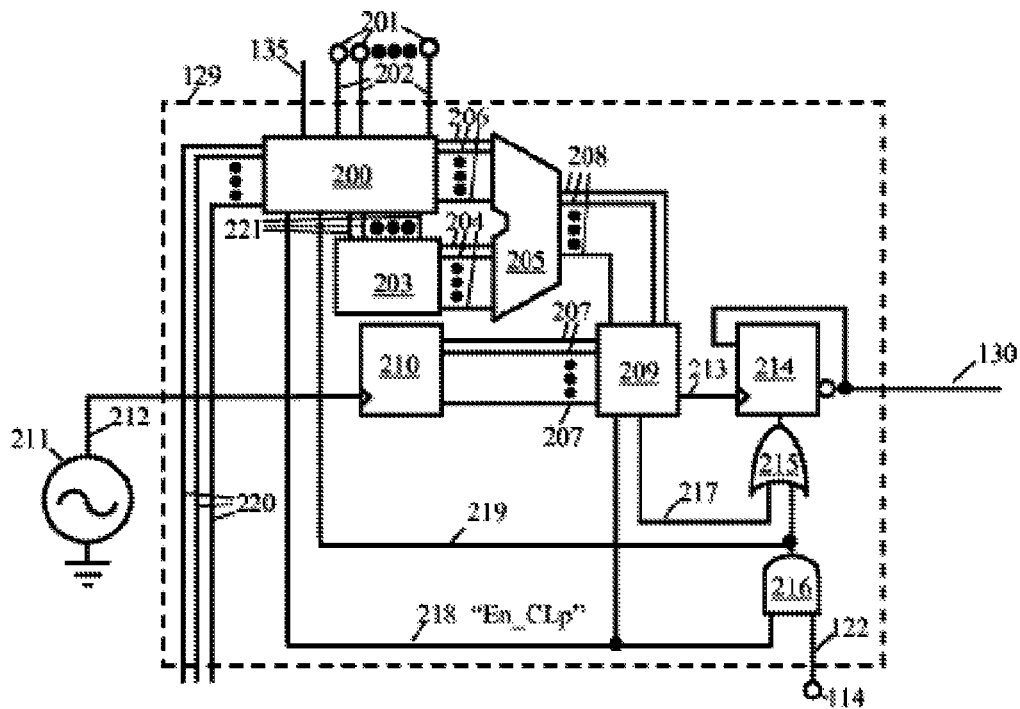
FIG. 2 illustrates a schematic and block diagram view of an exemplary switch mode power supply controller in accordance with one embodiment of the present invention.

FIG. 2 illustrates a digital schematic and functional block diagram of the pulse width or frequency modulation controller 129 for implementation within the preferred embodiment of the present invention. As described in the text of the reference U.S. Pat. No. 6,940,189 before, the output 212 of clock 211 feeds a counter 210. This clock 211 may be the buffered input of a clock source external to the semiconductor die 100, or an output of an internal clock generation circuit such as a phase-lock loop. The counter 210 clocked by output 212 derives the power supply switching frequency, Fs, and duty cycle, i.e. pulse width through decoder 209, with D flip-flop 214 responding exactly as before to signals 213 and that from OR gate 215 to form the output 130 that feeds the gate drivers 131, 132. Duty cycle, pulse width, or switching frequency of the power switching elements 103, 104 as voltage or current regulation control parameters are interchangeable due to their direct proportionality as mathematically proven in the reference U.S. Pat. No. 6,940,189.

The distinction from prior art and substantial novelty in the controller 129 of the preferred embodiment of the present invention exists in the establishment of a supervisory state machine 200 which enables open or closed loop operation through signal 218 "En_CLp". Positive-true "En_CLp" signal 218 enables closed loop operation by permitting signal 122 from input bonding pad 114, as shown in FIG. 1 providing the output 116 of the closed loop circuit 115, to pass through AND gate 216, to OR gate 215 which asynchronously resets flip-flop 214 ultimately determining the pulse width or pulse frequency of the power switching elements 103, 104 thereby affecting voltage or current regulation of the load 102. Naturally, the same "En_CLp" signal 218 would enable the aforementioned analog switches that switch-in and switch-out a single closed loop circuit 115 for embodiments comprising plural controllers 129 and power domains.

Supervisory state machine 200 in the present invention now also monitors the offset bus 202 from binary input pads 201, processes the data from the optional delay feedback bus 220, and controls read and write accesses on look-up table access bus 221 all of which affects pulse width or pulse frequency during open loop operation. The reference U.S. Pat. No. 6,940,189 and World Intellectual Property Organization Publication number WO 2008/048865 A2 thoroughly describe inputs to the offset bus 202 and the operational parameters which, in the present invention, the supervisory state machine 200 may alter permanently by writing memory or register locations within look-up table 203 through the look-up table access bus 221. Alternatively, the supervisory state machine 200 may temporarily alter voltage or current regulation parameters by outputting a data or instruction sequence to the arithmetic logic unit 205, through bus 206. As described in the references before, the arithmetic logic unit 205, takes a value equal to a number of clock 212 counts corresponding to the pulse width or pulse frequency that provides the precise voltage or current regulation for the present power state or power state transition of the system from bus 204, output from the look-up table 203. In the present invention, the arithmetic logic unit 205 then, under control of the supervisory state machine 200 via bus 206, alters the clock 212 count value from look-up table 203 on bus 204 for the present power switching period, $T_{SW}$, per delay feedback data path 220, or per offset bus 202. As explained before in the aforementioned references, bus 208 outputs the clock 212 counts value altered or not from arithmetic logic unit 205, and inputs this count value into decoder 209, which compares the look-up table value, altered or not, to the actual clock 212 counts output from counter 210 on bus 207. The decoder 209, then conditions the asynchronous reset output 217 and the clock output 213 to cause the D flip-flop 214 to output a signal 130 to the gate drivers 131, 132 of appropriate pulse width or pulse frequency for desired voltage or current regulation corresponding to the present power state or power state transition of the system. When operating in a closed loop mode engaging closed loop circuit 115, the supervisory state machine 200 provides data on bus 206 corresponding to the maximum pulse width or pulse frequency or instructs arithmetic logic unit 205 to output the same on bus 208. The output 116 from the closed loop circuit 115 can reduce this maximum pulse frequency or pulse width to the appropriate pulse width or pulse frequency for desired voltage or current regulation corresponding to the present power state of the system once connected to pad 114 by driving high signal 122 which in closed loop mode can propagate through AND gate 216, then OR gate 215 to asynchronously reset D flip-flop 214.

Within the scope of the present invention, the supervisory state machine 200 when operating in a closed loop mode engaging closed loop circuit 115, detects actual voltage or current regulation parameters of pulse width or pulse frequency, compares these actual values to the predicted values stored in look-up table 203, then averages the actual values and alters the predicted values in the look-up table 203 accordingly. This specification will further discuss this operation in the description of FIG. 7 subsequently.

As stated above, logic block 134 communicates system initiation information to the supervisory state machine 200 as represented by line 135. If implemented as an SMBus, the SMBus circuitry within the supervisory state machine 200 would suffice as an endpoint or slave in such a communication network.

Figure 3:
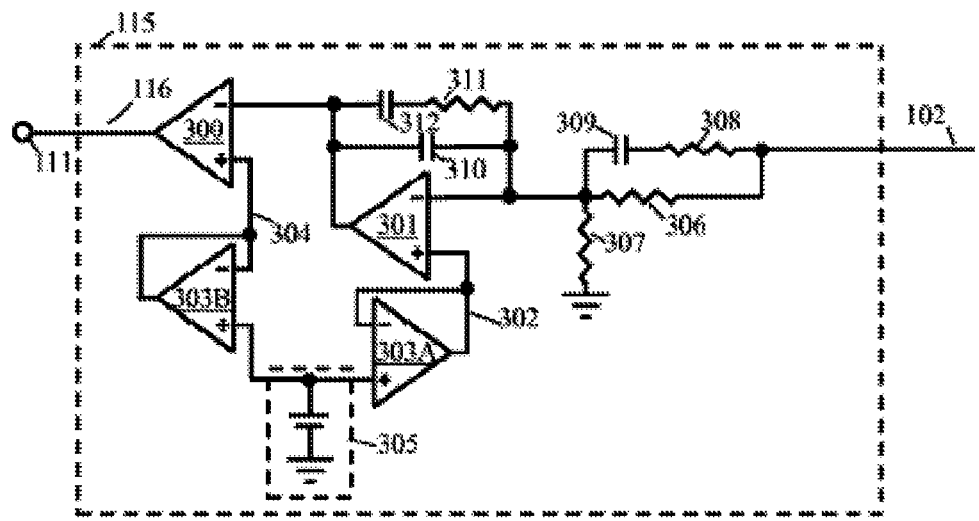
FIG. 3 illustrates a schematic view of an exemplary analog voltage feedback or feed-forward loop of a switch mode power supply system in accordance with one embodiment of the present invention.

FIG. 3 illustrates a prior art frequency compensating analog closed loop circuit 115. The exemplary network 115 of FIG. 3 attains its frequency compensating ability through the implementation of reactive components capacitor 309, capacitor 310, capacitor 312 at the input of, and within its internal feedback loop surrounding its error amplifier 301. The closed loop circuit 115 requires frequency compensation especially in feedback loop 115FB implementations to improve response of the loop connected to the inductor 105 and capacitor 106 forming a complex pole pair. A feed-forward loop 115FF would also likewise require frequency compensation if the preceding stage derives the voltage 101 through a similar inductor-capacitor complex pole pair filtered network. The following components comprise the analog voltage feedback loop common to most step-down switch mode power supplies and therefore could constitute any implementation within the scope of the present invention. All the discrete components external to the semiconductor die 100 including resistors 306, 307, 308, 311, capacitors 309, 310, 312, the band-gap voltage reference 305, the reference voltage buffers 303A, 303B, the error amplifier 301, and the analog voltage comparator 300 depicted in FIG. 3 exist in a feedback loop in common practice of prior art switch mode DC-to-DC converters. Since the circuitry of the prior art feedback loop does not constitute a substantial departure beyond the scope of the present invention, its use will hereinafter be briefly described. Resistors 308 and 311 and capacitors 309, 310, 312 form the frequency compensation of the error amplifier 301 within the analog voltage feedback loop of the traditional closed loop switch mode power supply. Tuning these frequency compensation components is not germane to the specification of the present invention and covered in detail in the specification of the reference U.S. Pat. No. 6,940,189.

The two resistors 306 and 307 form a voltage divider that allows arbitrary setting of the output voltage 102 given the fixed reference voltage presented at the output 302 of the reference voltage buffer 303A into the error amplifier 301. This output voltage 102 can then be arbitrarily fixed to any value given by the reference voltage multiplied by the quantity of one plus the ratio of resistor 306 over resistor 307. Within the scope of the present invention, the band-gap voltage reference 305 may exist within the semiconductor die 100, and buffered externally first by buffer 303A of equal voltage to node 302 into the error amplifier 301, then by buffer 303B of equal voltage to node 304 into the analog comparator 300. Not shown in FIG. 3 of the present specification, though within the scope of the present invention, could exist the insertion of resistive elements between the output of band-gap voltage reference 305 and the voltage buffers 303A and 303B to minimize noise coupling from the error amplifier 301 stage to the analog comparator 300 stage. To accommodate systems of plural voltage 102 domains of plural pulse width or pulse frequency modulation controllers 129, wherein as described before, one closed loop circuit 115 serves multiple controllers 129 in a time division multiplexed fashion, analog switches may also switch-in and switch-out various voltage setting resistors 306, 307 per each required voltage of a given power state. Alternatively, yet still within the scope of the present invention, one may implement a Digital-to-Analog Converter, DAC 305 instead of a band-gap voltage reference 305 and analog-switched voltage setting resistors 306, 307 to suit the preceding purpose. Note that the substantial novelty and distinction from prior art exists in the present invention whereby all the active components in the closed loop circuit 115 including but not limited to the band-gap voltage reference 305 or DAC 305, voltage buffers 303A, 303B, error amplifier 301 and analog comparator 300 may have their bias currents reduced to "stand-by" or entirely powered-off in order to reduce system power consumption while the pulse width or pulse frequency modulation controller 129 operates in open loop mode.

Because analog comparator 300 preferably outputs 116 a binary signal, this eliminates the necessity of an analog switch and thus output bonding pad 111 may simply wire-OR to plural bonding pads 114 of plural pulse width or pulse frequency modulation controllers 129 by virtue of AND gate 216 selecting the correct controller 129 into which comparator 300 feeds. To arbitrate between multiple controllers 129, the aforementioned communications or SMBus controller in logic block 134 sends instructions to the appropriate controller 129 to enable closed loop operation, to drive its particular signal 218 "En_CLp" high true.

Figure 4:
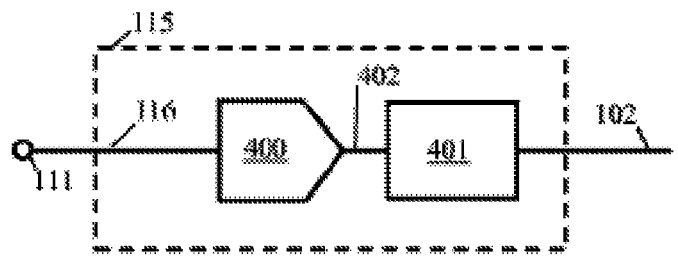
FIG. 4 illustrates a schematic view of an exemplary analog-to-digital converted voltage feedback or feed-forward loop of a switch mode power supply system in accordance with one embodiment of the present invention.

FIG. 4 presents a schematic diagram of an analog-to-digital converter ADC 400 within a feedback 115FB or feed-forward 115FF loop of a closed loop circuit 115. As with the schematic of FIG. 3, FIG. 4 portrays its input as originating at the output voltage 102. Clearly, for a feed-forward network 115FF, its input would originate at the input voltage 101, and likewise, for one leg of current feedback network 115CFB, its input would originate after the current sensing resistor 115R at node 102R. From this input, common practice dictates placement of an anti-aliasing filter 401 prior to analog-to-digital conversion. Generally, an anti-aliasing filter is a low pass filter with a corner frequency preferably about a decade below the sampling frequency of the ADC 400, and purely exemplary, not restrictive in the present specification. Once filtered, the input voltage may proceed to the ADC 400 through signal path 402. While depicted as a single-ended line, path 402 could also connect to the ADC 400 as a differential pair to reduce sampling noise or ground bounce. The sampling of this input would likely be at least two times the switching frequency of the power switching elements 103, 104 adhering to the Nyquist criterion for an accurate representation of the input signal. The aforementioned frequency compensation for such a closed circuit network 115, though now employing an ADC 400, would likely be implemented within the digital domain, essentially mimicking the same poles and zeros as in the analog frequency compensation network of FIG. 3, only derived from the digital design technique known by one skilled in the art as pole-zero matching. The output 116 of the ADC 400 in FIG. 4 requires a prior comparison to a binary representation of a set voltage, in order to directly source the one-bit positive-true digital signal 116 that ultimately provides an asynchronous reset to D Flip-flop 214 through pads 111, 114 when the sampled voltage exceeds the set voltage. Thus, the preferred embodiment of the present invention includes post-processing of the ADC 400 output including the digital comparison. Supervisory state machine 200 may communicate the binary representation of the set voltage to the ADC 400 comparator through a bus not explicitly shown. An alternative to the above post-processing, within the scope of the present invention exists inputting the ADC 400 output 116 as a bus into supervisory state machine 200 similar to the delay feedback loop bus 220. Therefore, the supervisory state machine 200 could perform the aforementioned comparison then generate an asynchronous reset comparable to signal 122, or reduce the pulse width or pulse frequency through the arithmetic logic unit 205 as previously discussed. As with the analog closed loop circuit 115 of FIG. 3, the ADC 400 of FIG. 4 may "stand-by" or entirely power-off, in order to reduce system power consumption while the pulse width or pulse frequency modulation controller 129 operates in open loop mode, again demonstrating substantial novelty and distinction from prior art.

Figure 5:
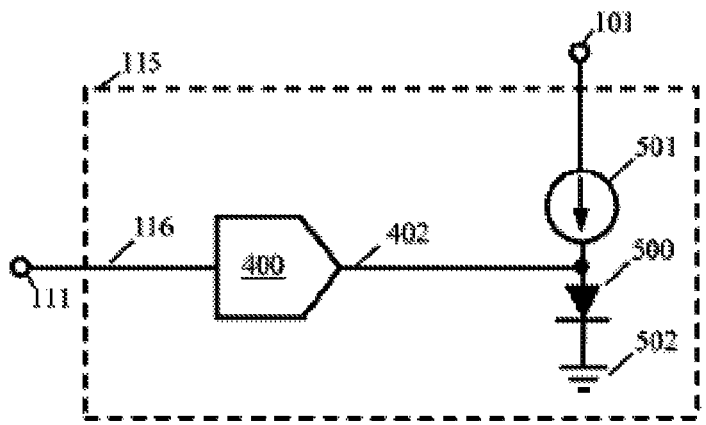
FIG. 5 illustrates a schematic view of an exemplary analog-to-digital converted temperature feedback loop of a switch mode power supply system in accordance with one embodiment of the present invention.

FIG. 5 depicts an analog-to-digital converted temperature feedback loop within a closed loop circuit 115. As in the previous figure, an ADC 400 samples a voltage through signal path 402, a single-ended line or a differential pair with one of two electrodes sourced at ground reference 502 to reduce sampling noise or ground bounce. Although not depicted in FIG. 5, placement of an anti-aliasing filter 401 in signal path 402 prior to analog-to-digital conversion as in FIG. 4 exists within the scope of the present invention. ADC 400 samples the voltage at the anode of a semiconductor junction 500 from which the system may calculate temperature. One skilled in the art understands the voltage across a semiconductor junction 500 behaves in a manner suitably linearly proportional to temperature; its forward bias voltage decreases approximately 1.8 millivolts for every degree Celsius rise in silicon temperature. The designer of such a system would consider the current source 501 which establishes the forward bias voltage across the semiconductor junction 500 must be pulsed and of adequately low duty cycle in order to minimize self-heating of the semiconductor junction 500, enabling an accurate measurement of ambient or semiconductor die 100 temperature. FIG. 5 indicates input voltage 101 feeds the current source 501, thus allowing operation independent from any controller 129. The semiconductor junction 500 could exist as the "body diode" formed between the drain and source of an unused field effect transistor in the midst of a functional block within the semiconductor die 100. While the present specification exemplified the use of a semiconductor junction 500 temperature sensor, implementation of any temperature sensing technology including but not limited to a zener type temperature sensor, a negative or positive thermal coefficient thermistor, or a resistive metallic or bi-metallic temperature detector exists within the scope of the present invention. Certain off-the-shelf digital temperature sensor devices today feature SMBus protocol communication links. Integration of such a device as a macro cell into a system embodying the present invention can be achieved whereby such a temperature sensor communicates to the controller 129 through the aforementioned SMBus master controller within logic block 134, or controller 129 itself may comprise an SMBus master controller. As in the discussion of the ADC 400 of FIG. 4, the output 116 presented on pad 111 requires a prior comparison to a binary representation of a set voltage now equated to a temperature, in order to directly source the one-bit positive-true digital signal 116 that ultimately provides an asynchronous reset to D Flip-flop 214 through pads 111, 114 when the sampled voltage exceeds the set voltage. Alternatively, a bus 220 as previously discussed in the description of the ADC 400 output 116 of FIG. 4 would be preferable for a semiconductor die 100 as a load, because thermal response is substantially slower than the switching frequency $F_{sw}$. Thus, the supervisory state machine 200 would adjust the pulse width or pulse frequency through the arithmetic logic unit 205 after detection, comparison, averaging, and adaptation based on temperature data.

One exemplary application area in which temperature sensing has become indispensable, exists in white LED lighting and dimming applications where a failure mode of heat fatigue in LED bonding wires has been recently commonly encountered. Another application that may demand temperature sensing in a semiconductor die 100 could be design verification or what one skilled in the art refers to as back-end design, device characterization such as determining optimal packaging for the semiconductor die 100, or analyzing overclocking margin versus die 100 heating. Characterization of a semiconductor die 100 with temperature and voltage feedback loops 115FB can facilitate determining design criterion such as suitability, cost, and necessity of such closed loop circuits 115. For instance, one may establish a correlation of voltage to temperature, and thus use either a voltage feedback or temperature feedback loop in order to most cost effectively regulate power to a given load. Design verification environmental testing on several sample die 100 of a lot in a test bed including temperature and voltage closed loop circuits 115 can facilitate determining if the characterization data from the design automation tools adequately predicted voltage or current regulation performance of the controller 129 in open loop mode, and thus which type of closed loop circuit 115, if any, is needed.

Figure 6:
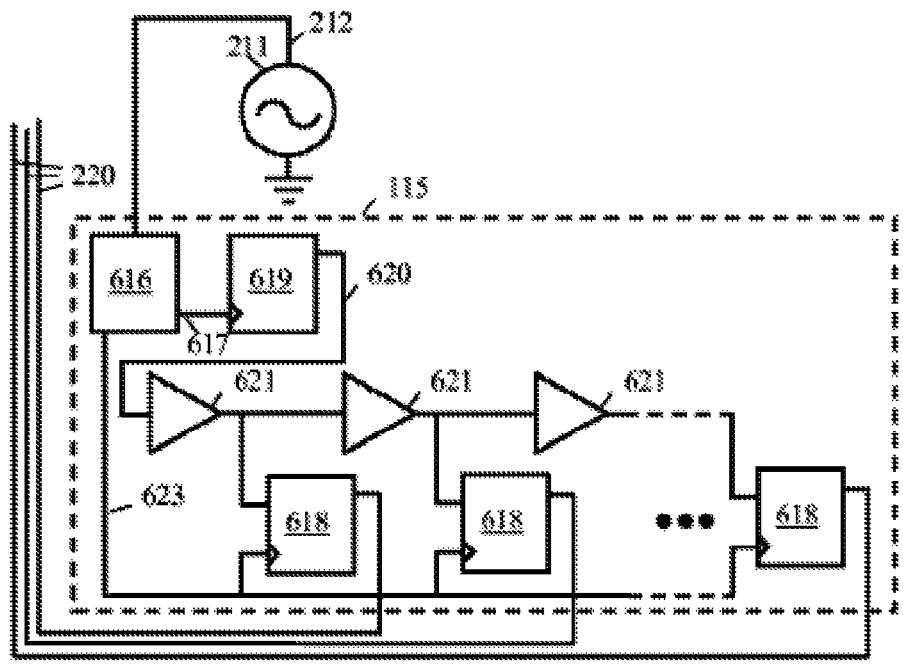
FIG. 6 illustrates a schematic view of an exemplary critical path delay feedback loop of a switch mode power supply system in accordance with one embodiment of the present invention.

The present specification will further exemplify the application of the present invention with a closed loop circuit 115 introduced in the exemplary reference World Intellectual Property Organization Publication number WO 2008/048865 A2. FIG. 6 illustrates a delay feedback loop 115, whereby a digital core within the semiconductor die 100 affects pulse width, given core cell delay data directly proportional to the core voltage 102 applied in order to accurately provide feedback. The clock output 212 of clock 211, if not of sufficiently high frequency, feeds a phase lock loop within the timing control block 616 to produce a higher frequency digital clock 617 that synchronizes the delay pulse controller 619 and delay measurement flip-flops 618 to the pulse width modulation controller 129. The digital clock 617 also feeds the rest of the synchronous application logic not shown, in the digital core and may vary in speed dependent upon the application and thus affect the power state of the entire exemplary system under development. The delay pulse controller 619 controls the output 620 providing a pulse that propagates through a delay chain symbolized by buffers 621, as the timing control block 616 determines using signal 623 the exact moment the delay measurement flip-flops 618 sample the delay chain buffers 621. Thus, the supervisory state machine 200 receives from bus 220 a vector indicating the number of delay chain buffers 621 through which the pulse from the controller output 620 propagated, measured by flip-flops 618. While this vector on bus 220 may exist in any arbitrary format, the supervisory state machine 200 decodes and compares this vector to an expected value of delay that guarantees margin in the safe operating range for the rest of the synchronous application logic within the digital core. The system designer may find this expected value of delay by determining the longest delay path in the synchronous application logic within the digital core as given by the design automation tools, and then replicating a delay chain of buffers 621 of approximately twice the length of this maximum core application logic delay path plus safety margin. The reference World Intellectual Property Organization Publication number WO 2008/048865 A2 defines a coefficient for this propagation time, $A_{TP}$, equal to the ratio of the vector originating from buffers 621 divided by the quantity of core application logic maximum delay path expected value plus margin. Therefore, for a closed loop delay feedback path such as that depicted in FIG. 6, one may implement steady state closed loop control topology for the exemplary system under development by factoring the coefficient $A_{TP}$ into an equation describing pulse width: $T_{Set(p)} \equiv A_{V(p)} A_{DE(p)} A_{TP} T_{sw}$ applying to the design of the control plant, as originally described in the aforementioned references. The distinction from prior art and substantial novelty in the present invention exists in the function of the supervisory state machine 200 whereby, the $T_{Set(p)}$ may get written over in the look-up table 203 and, during system power state transitions, a near critical damped step response is more assuredly obtainable in an open loop topology with the regulation set-point adjusted more precisely based on feedback data. The preceding description is purely exemplary, not restrictive. Clearly, an analogous implementation of a pulse frequency modulation controller 129 exists within the scope and spirit of the present invention.

Figure 7:
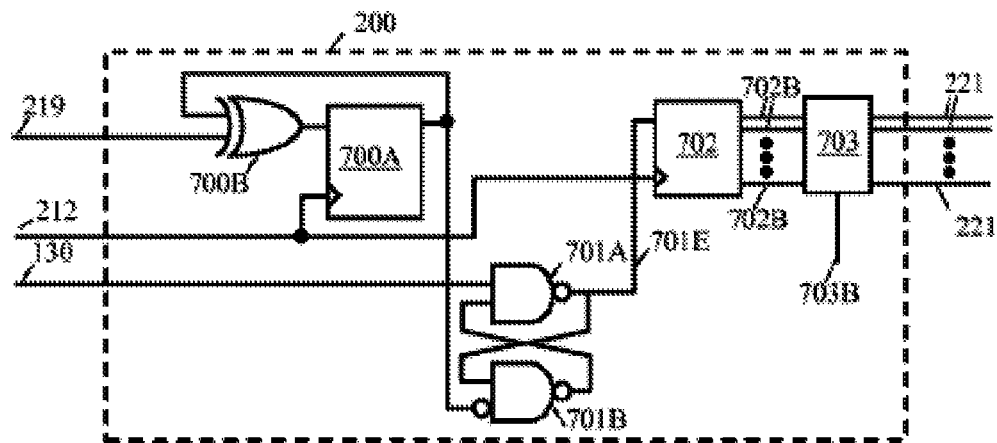
FIG. 7 illustrates a schematic view of an exemplary closed loop parameter detector and comparator circuit in accordance with one embodiment of the present invention.

FIG. 7 illustrates exemplary pulse width or pulse frequency detector and comparator circuits within the supervisory state machine 200. Flip-Flop 700A and XOR gate 700B as shown form an edge detection circuit to determine the moment the output 116 of the closed loop circuit 115 having passed through AND gate 216, asynchronously reset flip-flop 214, fed to supervisory state machine 200 as positive true signal 219 going active. This edge corresponds to the end of the pulse period and thus resets the set-reset flip-flop formed by the asynchronously fed-back NAND gates 701A and 701B shown. While some silicon design compilers warn about or do not permit asynchronous feedback as shown, they likely make available in their libraries a gate-level model of a set-reset flip-flop that behaves identically. Likewise, the output of the pulse width controller 130 sets the set-reset flip-flop formed by the asynchronously fed-back NAND gates 701A and 701B shown, thus representing the beginning of the pulse period. The output 701E of the set-reset flip-flop formed by the asynchronously fed-back NAND gates 701A and 701B shown enables counter 702 to count clock 212 periods while enabled. Both the start of the pulse period and end of the pulse period are delayed by exactly one clock, thus this circuit gives an exact measurement of a closed loop pulse width in terms of clock 212 counts, from which the controller 129 generates open loop pulse periods and power switching element 103, 104 switching frequency as previously described. The measurement of pulse period is output from counter 702 on bus 702B where digital comparator 703 compares this closed loop regulation parameter to the predicted parameter from look-up table 203 through supervisory state machine 200 having read the predicted parameter via look-up table access bus 221. Digital comparator output 703B signals whether the closed loop regulation parameter on bus 702B equals the predicted parameter on bus 221 or not. If equal, supervisory state machine 200 does no further processing during that switching period. If unequal, supervisory state machine 200 stores the closed loop regulation parameter in a temporary register for that switching period. The supervisory state machine 200 notes consecutive inequalities, after a given number of such, averages the closed loop parameter, then either stores it permanently in the look-up table location corresponding to the present power state, or uses the value to temporarily adjust the regulation parameter via the arithmetic logic unit 205 as previously described. The distinction between temporary and permanent adaptation of regulation parameters may lie in which closed loop circuit 115 differs from the predicted parameter. For instance, a closed loop parameter affected by temperature drift may incur a temporary adaptation, whereas a closed loop parameter affected by voltage feedback while temperature is within an expected range may warrant a permanent alteration, i.e. write to the look-up table 203.

The reference World Intellectual Property Organization Publication number WO 2008/048865 A2 elucidated a coefficient $A_{DE}$ that compensated pulse width for dynamic switching losses in the power switching elements 103, 104. This reference further defined a coefficient $A_{TP}$ compensating pulse width for core logic propagation delays that differ from predicted values within look-up table 203. As previously alluded, this reference established a coefficient, $T_{Set(p)}$ defining a pulse width for a given system power state, "p", and a coefficient, $\Delta T_{Set(m)}$ the difference of pulse widths to traverse during a given system power state transition, "m" from system power state "p" to "p+1". This reference also discussed controller 129 design constraints, delineating between computation-intensive and memory-intensive designs. The present invention hereby further discloses which coefficients would be adapted by the previously described operation of the supervisory state machine 200 given these design constraints. As applied to the present invention, a computation-intensive design would allot more resources to the supervisory state machine 200 comprising substantial mathematics processing including plural multipliers, whereas a memory-intensive design would allot more resources to the look-up table 203. Therefore, a computation-intensive design would benefit from the supervisory state machine 200 engaging a closed loop circuit 115 to adapt the coefficient $A_{DE}$ preferably through detecting, comparing, and manipulating data from, for instance voltage feedback, and adapt the coefficient $A_{TP}$ obviously through detecting, comparing, and manipulating data from core logic delay feedback. Similarly, a memory-intensive design would benefit from the supervisory state machine 200 engaging a closed loop circuit 115 to adapt the coefficients $T_{Set(p)}$ and $\Delta T_{Set(m)}$ as these coefficients directly define pulse widths, requiring substantial memory resources though relatively simple processing.

From the preceding description of the present invention, this specification manifests various techniques for use in implementing the concepts of the present invention without departing from its scope. Furthermore, while this specification describes the present invention with specific reference to certain embodiments, a person of ordinary skill in the art would recognize that one could make changes in form and detail without departing from the scope and the spirit of the invention. This specification presented embodiments in all respects as illustrative and not restrictive. All parties must understand that this specification does not limited the present invention to the previously described particular embodiments, but asserts the present invention's capability of many rearrangements, modifications, omissions, and substitutions without departing from its scope.

Thus, a control multiplexor for a switch mode power supply has been described.

What is claimed is:

1. A system, comprising:
 a controller configured to:
   control operation of a switch mode power supply between an open loop control operation and a closed loop control operation;
   reduce a bias current of a component configured to participate during the open loop control operation; and
   modify a predicted voltage or current regulation parameter configured to control a pulse width or a pulse frequency of a pulse signal during steady state operation of a defined power state of the system, based on a degree to which the predicted voltage or current regulation parameter is different from another voltage or current regulation parameter determined during the closed loop control operation.

2. The system of claim 1, wherein the controller is further configured to enable the open loop control operation and disable the closed loop control operation for power state transitions.

3. The system of claim 2, wherein the controller is further configured to enable the open loop control operation resulting in a substantially critically damped step response during the power state transitions.

4. The system of claim 2, wherein the controller is further configured to enable the open loop control operation to maintain a substantially flat voltage during current transients of the power state transitions.

5. The system of claim 2, wherein the controller is further configured to enable the closed loop control operation to determine a temperature characteristic of a system package.

6. The system of claim 2, wherein the controller is further configured to enable the closed loop control operation to reduce heat fatigue within the system.

7. The system of claim 1, wherein the controller is further configured to adapt the open loop control operation based on a modified predicted voltage or current regulation parameter determined based on a modification to the predicted voltage or current regulation parameter, and wherein the modification is based on the degree to which the predicted voltage or current regulation parameter is different from the other voltage or current regulation parameter.

8. The system of claim 1, wherein the controller is further configured to disable a component configured to participate in the closed loop control operation during the steady state operation to save power consumed in a feed-forward or feedback loop component.

9. The system of claim 8, wherein the feed-forward or feedback loop component comprises an analog-to-digital converter.

10. The system of claim 9, wherein the analog-to-digital converter is configured to sample a voltage from a temperature sensor.

11. The system of claim 8, wherein the feedback loop comprises a logic delay detector.

12. The system of claim 8, wherein the component configured to participate in the closed loop control operation includes a band-gap voltage reference, a voltage buffer, an error amplifier, an analog comparator, or an analog-to-digital converter.

13. The system of claim 1, wherein the predicted voltage or current regulation parameter is configured to be stored in a data structure, and wherein the controller is further configured to further modify the predicted voltage or current regulation parameter stored in the data structure based on the degree to which the predicted voltage or current regulation parameter is different from the other voltage or current regulation parameter.

14. The system of claim 13, wherein the controller is further configured to employ the predicted voltage or current regulation parameter to adapt a characteristic of the open loop operation.

15. The system of claim 1, wherein the predicted voltage or current regulation parameter is configured to be averaged over plural switching periods.

16. The system of claim 1, wherein the controller is further configured to employ the other voltage or current regulation parameter to determine that the closed loop control operation is to be employed.

17. The system of claim 1, wherein the controller is further configured to temporarily adjust the predicted voltage or current regulation parameter.

18. The system of claim 1, wherein the controller is further configured to temporarily adjust the predicted voltage or current regulation parameter in response to a temperature drift.

19. The system of claim 1, wherein the controller is further configured to temporarily adjust the predicted voltage or current regulation parameter with a previously presented voltage or current regulation parameter determined while in the closed loop control operation and averaged over switching periods.

20. The system of claim 1, wherein the controller is further configured to adjust a regulation set-point based on the other voltage or current regulation parameter that controls the pulse width or the pulse frequency of the pulse signal during the steady state operation of the power state of the system in the open loop control operation to obtain a substantially critically damped step response during a system state transition.

21. The system of claim 1, wherein the controller is further configured to adjust a regulation set-point based on the other voltage or current regulation parameter that controls the pulse width or the pulse frequency of the pulse signal during the steady state operation of the power state of the system in the open loop control operation to obtain a substantially flat voltage during current transients of a power state transition.

22. The system of claim 1, wherein the controller is further configured to adapt the pulse width or the pulse frequency of the pulse signal in the open loop control operation based on the other voltage or current regulation parameter.

23. The system of claim 1, wherein the controller is further configured to adapt coefficients that compute the pulse width or the pulse frequency in the open loop operation based on the other voltage or current regulation parameter.

24. The system of claim 1, wherein the controller is further configured to:
control the operation of the switch mode power supply between the open loop control operation and the closed loop control operation to regulate power consumption for a first voltage domain circuit;
share the closed loop circuit with a plurality of voltage domain circuits; and
switch in and out of the closed loop circuit according to a time division multiplexing manner across the plurality of voltage domain circuits.

25. The system of claim 1, wherein the controller is further configured to determine the other voltage or current regulation parameter has been averaged over plural switching periods.

26. A method, comprising:
supplying a current to a load using a switch mode power supply;
alternating between applying a closed loop operation and an open loop operation to facilitate the supplying the current to the load;
reducing a bias current of a component operable to participate in the closed loop operation during the open loop operation; and
modifying a predicted current regulation parameter used to control a pulse width or a pulse frequency of a pulse signal during steady state operation of a power state of a system associated with the open loop operation and the closed loop operation, based on a degree to which the predicted current regulation parameter deviates from another current regulation parameter determined during the closed loop control operation.

27. The method of claim 26, wherein the component operable to participate in the closed loop operation comprises an analog-to-digital converter that samples a voltage from a temperature sensor.

28. The method of claim 26, further comprising:
enabling the open loop operation;
disabling the closed loop operation during a power state transition associated with the supplying; and
reducing power consumed by the system.

29. The method of claim 26, wherein said applying the open loop control operation comprises adapting the open loop control operation based on the other current regulation parameter.

30. The method of claim 26, wherein the predicted current regulation parameter is averaged over plural switching periods.

31. The method of claim 26, further comprising:
storing the predicted current regulation parameter in a data structure; and
employing information in the data structure to control the open loop operation.

32. The method of claim 26, wherein said modifying comprises adjusting the predicted voltage regulation parameter in response to a temperature drift.

33. The method of claim 26, further comprising:
adjusting a regulation set-point based on a comparison between the other voltage regulation parameter and the predicted voltage regulation parameter to obtain a substantially critically damped step response during a power state transition of the system.

34. The method of claim 26, further comprising:
adjusting a regulation set-point based on a comparison between the other voltage regulation parameter and the predicted voltage regulation parameter to obtain a substantially flat voltage during current transients of a power state transition of the system.

35. The method of claim 26, further comprising:
adapting the pulse width or the pulse frequency of the pulse signal in the open loop control operation based on the other voltage regulation parameter.

36. The method of claim 26, further comprising:
adapting a coefficient that computes the pulse width or the pulse frequency of the pulse signal in the open loop operation based on the other voltage regulation parameter.

37. The method of claim 26, wherein the component operable to participate in the closed loop operation comprises a band-gap voltage reference, a voltage buffer, an error amplifier, or an analog comparator.

38. The method of claim 26, further comprising:
employing the closed loop circuit with a plurality of voltage domain circuits; and
switching in and out of the closed loop circuit according to a time division multiplexing manner across the plurality of voltage domain circuits.

39. A system, comprising:
means for employing a switch mode power supply and supplying a current to a load;
means for alternating between applying a closed loop operation and an open loop operation to facilitate the supplying of the current to the load, wherein the means for alternating includes means for reducing a bias current of a component configured to participate in the closed loop operation during the open loop operation; and
means for modifying a predicted current regulation parameter that controls a pulse width or a pulse frequency of a pulse signal during steady state operation of a defined power state of the system, based on a degree to which the predicted current regulation parameter is different from another current regulation parameter determined during the closed loop control operation.

40. The system of claim 39, further comprising:
means for enabling the open loop control operation and disabling the closed loop control operation during a power state transition associated with supplying by the means for supplying.

41. The system of claim 39, wherein the means for applying the open loop control operation includes means for adapting the open loop control operation in response to the other current regulation parameter being determined.

42. The system of claim 39, wherein the component configured to participate in the closed loop operation comprises a band-gap voltage reference, a voltage buffer, an error amplifier, an analog comparator, or an analog-to-digital converter.

43. The system of claim 39, further comprising:
means for employing the closed loop circuit with a plurality of voltage domain circuits; and
means for switching in and out of the closed loop circuit according to a time division multiplexing manner across the plurality of voltage domain circuits.

* * * * *